United States Patent
Beyda

(10) Patent No.: US 6,766,422 B2
(45) Date of Patent: Jul. 20, 2004

(54) METHOD AND SYSTEM FOR WEB CACHING BASED ON PREDICTIVE USAGE

(75) Inventor: William J. Beyda, Cupertino, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/965,502

(22) Filed: Sep. 27, 2001

(65) Prior Publication Data

US 2003/0061451 A1 Mar. 27, 2003

(51) Int. Cl.[7] .............................................. G06F 12/00
(52) U.S. Cl. ....................... 711/137; 133/118; 133/134
(58) Field of Search ................................ 711/133, 118, 711/137, 134; 712/207; 709/203; 707/200, 201, 203

(56) References Cited

U.S. PATENT DOCUMENTS

| | | | | |
|---|---|---|---|---|
| 5,802,292 A | | 9/1998 | Mogul | ........................ 709/203 |
| 6,003,114 A | * | 12/1999 | Bachmat | ...................... 711/113 |
| 6,085,193 A | * | 7/2000 | Malkin | ......................... 707/10 |
| 6,128,701 A | | 10/2000 | Malcolm et al. | ............. 711/133 |
| 6,256,028 B1 | * | 7/2001 | Sanford | ....................... 345/353 |
| 6,272,598 B1 | | 8/2001 | Arlitt et al. | .................. 711/133 |

OTHER PUBLICATIONS

"Caching Tutorial for Web Authors and Webmasters", Jun., 19, 2000, Version 1.32.
"Web Caching Architecture", Mar. 20, 1997.

* cited by examiner

Primary Examiner—Kimberly McLean-Mayo

(57) ABSTRACT

The present method for predictive caching operation determines a time-based pattern of a high-access period for a web page, and pre-fetches the web page into a cache before the high access period begins. A table is generated where the table comprises a URL, a time of last access and a time stamp of the pre-fetched web page. When a request for a web page is made, the requested web page's URL and time stamp are checked with the URL and time stamp listed in the table to determine whether any modification has been made. The web page which has been modified is downloaded into the cache.

17 Claims, 2 Drawing Sheets

TABLE

| URL | Last Access Time | Time Stamp |
|---|---|---|
| www.cnn.com — 30 | $t_1$ — 32 | $t_2$ — 34 |
| www.cnn.com/graphic.jpg1 — 36 | $t_3$ | $t_4$ |
| www.cnn.com/graphic.jpg2 — 38 | $t_5$ | $t_6$ |
| www.cnn.com/graphic.jpg3 — 40 | $t_7$ | $t_8$ |
| www.cnn.com/audio — 42 | $t_9$ | $t_{10}$ |

FIG. 2

METHOD AND SYSTEM FOR WEB CACHING BASED ON PREDICTIVE USAGE

FIELD OF THE INVENTION

The present invention relates generally to Internet/Intranet network systems, and in particular, to web caching where Web objects are predictively pre-cached based on time-based pattern of usage.

BACKGROUND OF THE INVENTION

Web caching is generally well known to those skilled in the art. Generally, a web cache sits between web servers (or remote servers) and a client and watches requests for HTML pages, images and files (known as objects) as they come by, saving a copy for itself. Typically, the web cache resides in a proxy server that sits in a local server. Then if there is another request for the same object, it will use the copy that it has, instead of asking the remote server for it again.

There are two main reasons for using web caches. One is to reduce latency. Because the request is satisfied from the cache (which is closer to the client) instead of the remote server, it takes less time for the client to get the object and display it. This makes web sites seem more responsive. The second reason is to reduce traffic. Because each object is only gotten from the server once, it reduces the amount of bandwidth used by a client. This saves money if the client is paying based on traffic, and keeps their bandwidth requirements lower and more manageable.

Generally, there are two types of web caches: browser caches and proxy caches. The browser cache works by setting a section of a computer's hard disk to store objects. The browser cache works according to fairly simple rules. It will check to make sure that the objects are fresh, usually once a session. Proxy cache, while it works on a similar principle, is usually located in a local server, a gateway, or a router and can be shared by a number of clients.

All caches have a set of rules that they use to determine when to serve an object from the cache if it's available. Some of these rules are set by the HTTP protocols and, some are set by the administrator of the cache. (For a full discussion of above, see *Caching Tutorial for web Authors and webmasters* by Mark Nottingham).

A number of cache replacement strategies are currently suggested as an attempt to optimally reduce latency and/or traffic. For instance, U.S. Pat. No. 6,272,598 describes a cache system that includes a storage that is partitioned into a plurality of storage areas. Each storage area stores one kind of object received from remote sites. The cache system further includes a cache manager which causes objects to be stored in the corresponding storage areas of the storage. The cache manager causes cached objects in each of the storage areas to be replaced in accordance with one of a plurality of replacement policies, each being optimized for one kind of objects.

In another example, the U.S. Pat. No. 6,128,701 describes a system for automatically refreshing documents in a cache, so that each particular document is refreshed no more often and no less often than needed. For each document, the cache estimates a probability distribution of times for client requests for that document and a probability distribution of times for server changes to that document. Times for refresh are selected for each particular document in response to both the estimated probability distribution of times for client requests and the estimated probability distribution of times for server changes.

Yet in another example, the U.S. Pat. No. 5,802,292 describes a method for predictive pre-fetching of objects over a computer network which includes the steps of providing a client computer system, providing a server computer system, a network link to the client computer system, requesting from the server computer system by the client computer system a retrieval of a plurality of objects, retrieving the plurality of objects by the server system, storing the retrieval and an identity of the client computer system in the memory of the server computer system, sending the plurality of objects from the server computer system to the client computer system over the network link, predicting in the server computer system a subsequent retrieval request from the client computer system according to a predetermined criteria, sending the prediction to the client computer system, and pre-fetching by the client computer system an object based on the prediction and other information.

In general, however, a conventional caching method being employed is one where a table keeps track of the requested web page URL (Universal Resource Locator), the time it was last used, and the time stamp of the page. If the table can hold one hundred entries, for instance, then the last hundred web pages visited by the server client using this cache will still be cached locally. If a page is not found in the local cache, the hundredth page is removed from the table, and the URL of the new page is added to the top of the table. If a page is found in the local cache, the cache requests a new page from the remote server, checks the time stamp, and if it is the same as the time stamp of the web page found in the table, stops the transfer and delivers the web page already cached. If the time stamp is different, however, the page is reloaded into the cache and is delivered to the client.

In this prior art method the local server only keeps track of the time stamp of the web page. A web page, however, is typically composed of many elements or objects, such as text files, graphic files, audio files, and video files. Each of these elements or objects has a unique URL and a time stamp, and can be downloaded independently of each other. However, the conventional caching method does not keep track of these individual elements. Consequently, a decision to use a cached web page is an "all or nothing" deal. Even if only a component, e.g. a graphic file, has changed on a web page, the entire web page is requested from a remote server. Consequently, all of the elements that make up the web page need to be sent again. A significant reduction in latency and/or traffic may be achieved by keeping track of the time stamp of the individual elements of a web page as well as the time stamp of the web page itself, and only requesting those elements which have undergone a change. However, this type of replacement strategy is not available in the current cache systems.

Moreover, in the current caching system, the web pages are cached at the time they are requested. While this type of caching method does help to reduce the overall traffic and latency, it does not take into account the fact that certain web pages are downloaded more heavily during certain times of the day. The latency may further be reduced if the web pages which are popular during a certain period is pre-loaded some time before the "high-access period" begins. By pre-loading the web pages, the clients will experience fewer delays in accessing the web pages. If the high access period for a particular site happens to be during a heavy congestion period, the web pages may be pre-loaded or pre-fetched into the cache during a less congested period. This will reduce both latency as well as traffic. However, this type of time-based method of predictive pre-fetching of web pages is currently not available.

SUMMARY OF THE INVENTION

The present method for predictive caching operation determines a time-based pattern of a high-access period for a web page, and pre-fetches the web page into a cache before the high access period begins. A table is generated where the table comprises a URL, a time of last access and a time stamp of the pre-fetched web page. When a request for a web page is made, the requested web page's URL and time stamp are checked with the URL and time stamp listed in the table to determine whether any modification has been made. The web page which has been modified is downloaded into the cache.

In another embodiment, the method for predictive caching operation comprises determining a time-based pattern of high-access period for a web page; pre-fetching the web page into a cache before the high access period begins; generating a table, said table comprising a URL, a time of last access and a time stamp of the pre-fetched web page, said table further comprising a URL, time of last access and time stamp of elements found on the pre-fetched web page; when a request for a web page is made, checking the requested web page's URL and time stamp and URL and time stamp of the requested web page's corresponding elements with the URL and time stamp listed in the table to determine whether any modification has been made; and selectively downloading in a cache only those elements which are deemed to have been modified.

BRIEF DESCRIPTION OF THE DRAWINGS

FIG. 2 illustrates a table which may be used by the preferred embodiment of the present cache system to keep track of the URL, time of last access, and time stamp of web pages and the elements that make up the web pages.

DETAILED DESCRIPTION OF THE INVENTION

Figure 1:
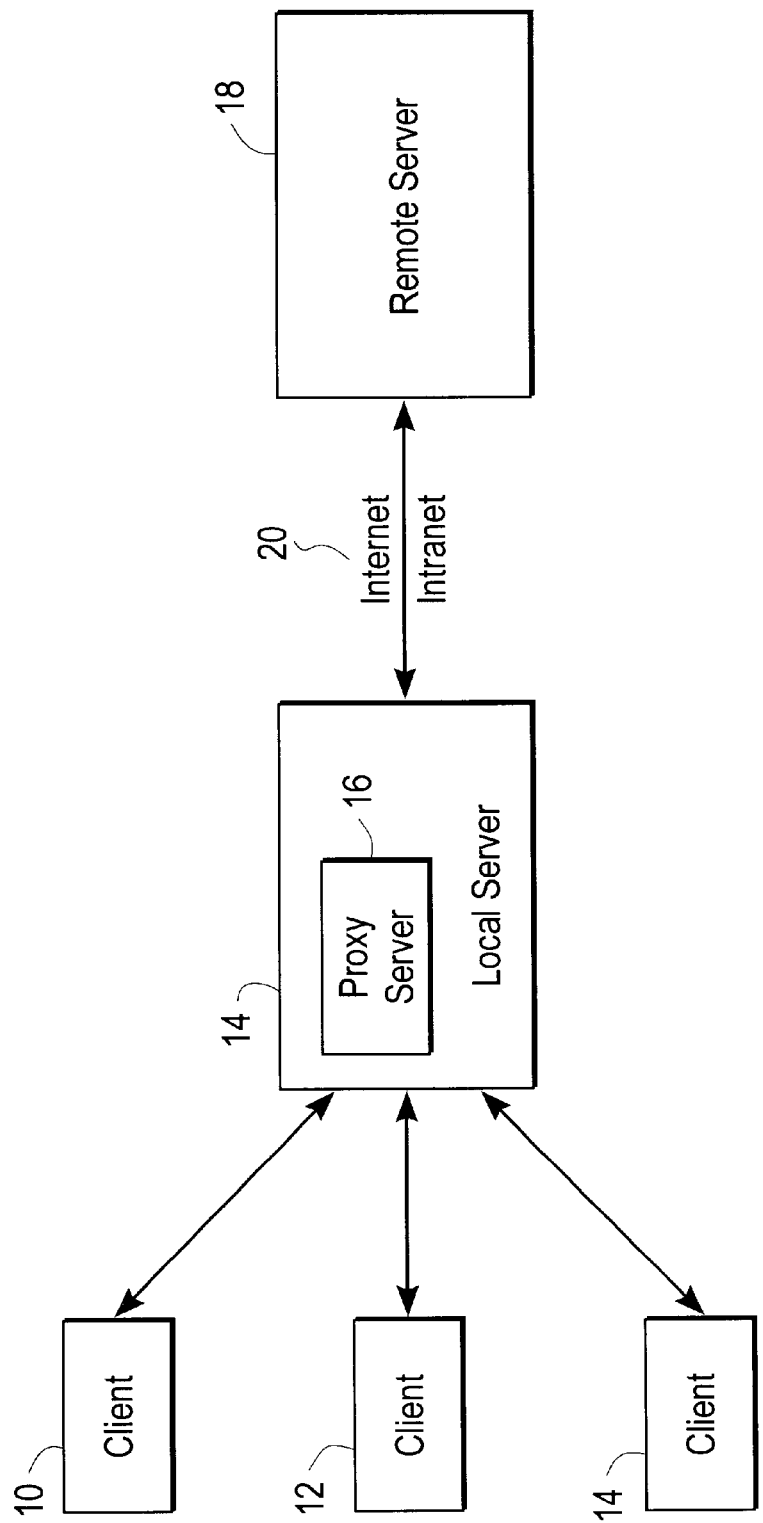
FIG. 1 illustrates an Internet/Intranet network system in which the present method of predictive caching may be employed.

FIG. 1 illustrates a typical client/server Internet/intranet network environment where the present method of predictive caching may be employed. As illustrated, FIG. 1 shows a plurality of clients 10, 12, 14 connected to a local server 14. The local server 14 houses a proxy server 16 where caching is accomplished. The web cache is shared by all of the clients. The local server 14 is connected to Internet or Intranet 20 and can receive from a remote server 18 various documents or objects such as web pages, graphic files, audio files, etc. Although here the proxy server 16 was shown to be in the local server 14, it should be understood that it may be found in other devices such as a router or a gateway or other servers.

In the preferred embodiment of the present invention, a table as shown in FIG. 2 is created in the proxy server 16. As illustrated, this table keeps track of URLs of all web pages that are requested by any of the clients 10, 12, and 14. For each of the URLs listed, the table keeps the time the last client accessed the web page, and the corresponding modification time stamp of when the page was last modified. This modification time stamp, hereinafter referred to as simply the "time stamp", refers to the last time something changed in the content at this particular URL. As an example, assuming that a client has requested the web page having the URL www.cnn.com, the table in FIG. 2 includes the URL "www.cnn.com" 30, the time 32 any client served by this cache last accessed the web page, and the page's own corresponding time stamp 34, indicating when anything on it was last modified. Assuming for this example that the web page having the URL "www.cnn.com" has three graphic files and an audio file, the URLs of each of the graphic files and audio file is also listed under the main web page as sub-entries. Here, the graphic files have the URL, "www.cnn.com/graphic.jpg1", 36, "www.cnn.com/graphic.jpg2" 38, and "www.cnn.com/graphic.jpg1", 40. The audio file has the URL, "www.cnn.com/audio" 42. For each of the URLs of the sub-entry URLs, the corresponding last-access time and time stamp are also listed.

Of course, in reality, the table will contain multiple URLs and their corresponding sub-entries. How many URLs and sub-entries are allowed depends on the size of the cache and can vary from system to system. If the table is already full, then the most recently requested web page URL which is not already found in the table will be placed into the table, and the "oldest" web page URL will be removed from the table, based on the oldest "access" time entries in the table.

When a client sends a request to the local server 14 for a web page, the URL of the requested web page is searched in the table as shown in FIG. 2. If the requested URL is not found, then the local server 14 directs the request to the remote server 18 via the Internet/Intranet 20. Once the remote server 18 receives the request, it directs a response with the requested web page to the client 10 via the local server 14. During this process, the requested web page is also cached in the proxy server 16 of the local server 14, and the corresponding details, i.e. URLs, time and time stamp, are captured in the table of FIG. 2.

If, on the other hand, the URL is found in the table of FIG. 2, the local server 14 sends the request to the remote server 18 and checks the time stamp of the requested web page. If the time stamp of the web page from the remote server 18 matches the time stamp in the table, then the local server 14 stops the transfer, and delivers to the client the web page already cached in the proxy server 16. If, on the other hand, the time stamp is different, the local server allows the download of the main part of the web page (the shell without the elements), but interrupting it as soon as the shell is complete. The local server 14 then checks the URLs of each of the elements belonging to the web page. If a matching URL is not found, then the local server 14 deems that the element has changed and downloads the element to local server 14. If a matching URL is found, then the local server 14 checks the time stamp of the element and matches against the table. If a match is found, then that element is not deemed to be new, and the element found in the cache is used. If a match is not found, however, then the local server 14 deems that a change has occurred, and initiates the download of the changed element. Of course, whenever a new element is downloaded, the table is updated such that the URL of the element and its last access time and time stamp replace the outdated information in the table. As the elements are downloaded to the local server 14, they are in turn passed on to the client 10. It is not necessary to wait until all elements have been verified and downloaded to the server 14 before beginning the transfer of elements on to the client 10.

Thus far we have described the filling of the cache as users access web pages. We will now describe how we predictively pre-fetch web pages to also enter into the cache. As the various web pages and their corresponding elements are cached in the proxy server and the corresponding details, e.g., URL, are recorded in the table of FIG. 2, the local server 14 keeps track of the time-based pattern of the web pages that are being requested. The usage pattern is divided into a certain pre-determined time period. For instance, the time period may be 30 minutes, though other time periods, e.g., 1 hour, are clearly possible. Within this time period, the local server 14 records the hit rate of every web page visited, and ranks the web pages according to the hit rate. Though this process of measurement can be repeated for an entire day, it may be beneficial to do it only for the high congestion periods. So for instance, assuming that a high congestion period is the lunch period, a local server might record the hit rates according to the following schedule: 12 PM to 12:30 PM, 12:30 PM to 1:00 PM, 1:00 PM to 1:30 PM, and 1:30 PM, 2:00 PM. This process can be repeated for every day of a business week, and perhaps using a different scheme for the weekend since the pattern of usage may differ for the weekend.

The obtained data is then analyzed for repeating patterns. For instance, the data may indicate that certain web pages are always or frequently ranked high in hits during a certain time of the day. For instance, a web page displaying a stock market summary may be accessed more frequently near the market closing time. This pattern may be consistent throughout the week regardless of the month of the year.

For other web pages, however, the pattern may be a bit more complex. For instance, some web pages may have a high hit rate only on one particular day out of the week. For instance, a web page displaying the latest movies may have high hit rates near the end of the working hours on a Friday. Yet for other web pages, the pattern may be on a monthly basis, that is, the high hit rate is shown only on one particular day of the month, e.g., the last day of the month.

Once the pattern has been determined for a particular web page, it is then possible to predictively pre-fetch web pages into a cache. For instance, if it is determined that www.cnn.com is highly popular during the time period 12:30 PM to 1:00 PM during weekdays, the local server 14 may pre-fetch the web page a few minutes before 12:30 PM. How close to the "high-access period" the pre-fetching occurs can depend on factors such as how time-sensitive the information is or high frequently the web pages to be pre-fetched are updated. If a web page receives a high rate of hits only on one day out of the week, then the pre-fetching only needs to occur only for that day.

If reducing traffic is a concern, then the pre-fetching may be performed during a low congestion period, though this may mean that there would be a higher probability that the pre-fetched web page has undergone a modification before the client has accessed the page.

Predictively pre-fetched pages can be stored in the same cache as the pages recently accessed by users, or in a separate cache. If they are kept in a separate cache, then both caches will need to be checked when a user requests a page. If they are kept in the same cache, then the administrator will need to configure what percentage of the cache is for pre-fetched pages, and what percentage is for pages recently accessed by users. This percentage can also be fixed, rather than configurable. It is important that the pre-fetching cache (or pre-fetching portion of a single cache) be at least large enough to hold two periods of data, the current period, and the next period. A smaller predictive cache would result in pages pre-fetched for future time periods overwriting the ones previously pre-fetched for the current time period, thereby eliminating the benefit of pre-fetching.

When a web page is pre-fetched, it is stored in the cache and its URL, last-access time (which, for a pre-fetched web page, will be the end of the future time period for which the pre-fetched page is anticipated to be needed), and time stamp will be recorded in the table of FIG. 2 just as though a client had requested the web page. When a client requests the pre-fetched web page, the local server 14 will perform the identical operation described above to ensure that the web page has not undergone a modification. If a modification has occurred, then only the elements which have undergone a change are downloaded into the cache per the process described above.

Although this element-by-element downloading into the cache can greatly reduce latency and/or traffic and is incorporated into the preferred embodiment of the present invention, it is not essential to the predictive caching method described herein and the predictive caching operation can operate independently from the element-by-element downloading operation. Hence, for embodiments not incorporating this element-by-element downloading operation, a conventional table as described in the Background section may be utilized.

The present method of predictive caching of web pages can greatly reduce latency and/or traffic in a network environment by allowing only the web pages to be downloaded from the remote server prior to when the clients request them. Having described a preferred embodiment of this method, it will now become apparent to those skilled in the art that other embodiments incorporating its concepts may be provided. This invention, therefore, should not be limited to the disclosed invention, but should be limited only by the spirit and scope of the appended claims.

What claimed is:

1. A method for predictive caching operation comprising:
   determining a time-based pattern of high-access period for a web page;
   pre-fetching the web page into a cache before the high access period begins;
   generating a table, said table comprising a URL, a time of last access and a time stamp of the pre-fetched web page, said table further comprising a URL, time of last access and time stamp of elements found on the pre-fetched web page;
   when a request for a web page is made, checking the requested web page's URL and time stamp and URL and time stamp of the requested web page's corresponding elements with the URL and time stamp listed in the table to determine whether any modification has been made; and
   selectively downloading in a cache only those elements which are deemed to have been modified.

2. The method as recited in claim 1 further comprising: updating the table such that the URL of the downloaded elements and their corresponding last access time and time stamp replace outdated information in the table.

3. The method as recited in claim 1 wherein the requested web page is deemed to have been modified if the time stamp of the requested web page does not match with the time stamp in the table.

4. The method as recited in claim 1 wherein an element is deemed to have been modified if the time stamp of the element does not match with the time stamp in the table.

5. The method as recited in claim 1 wherein an element of a web page is deemed to have been modified if the URL of the web page is found in the table but URL of the corresponding element is not found in the table.

6. A method for predictive caching operation comprising:
   determining a time-based pattern of high-access period for a web page; pre-fetching the web page into a cache before the high access period begins;

generating a table, said table comprising a URL, a time of last access and a time stamp of the pre-fetched web page, said table further comprising a URL, time of last access and time stamp of elements found on the web page;

when a request for a web page is made, checking the requested web page's URL and time stamp with the table to determine whether any modification has been made to the web page, said requested web page containing a plurality of elements;

downloading the requested web page but interrupting the download before the elements are downloaded;

checking the elements' URL and time stamp with the table to determine whether any modification has been made to any of the elements; and selectively downloading into a cache only those elements which are deemed to have been modified.

7. The method of caching as recited in claim 6 further comprising:

updating the table such that the URL of the downloaded elements and their corresponding last access time and time stamp replace outdated information in the table.

8. The method of caching as recited in claim 6 wherein the requested web page is deemed to have been modified if the time stamp of the requested web page does not match with the time stamp in the table.

9. The method of caching as recited in claim 6 wherein an element is deemed to have been modified if the time stamp of the element does not match with the time stamp in the table.

10. The method of caching as recited in claim 6 wherein an element of a web page is deemed to have been modified if the URL of the web page is found in the table but URL of the element is not found in the table.

11. A system for predictive caching operation comprising:

a mechanism for determining a time-based pattern of high-access period for a web page;

a mechanism for pre-fetching the web page into a cache before the high access period begins;

a table, said table comprising a URL a time of last access and a time stamp of the pre-fetched web page, said table further comprising a URL, time of last access and time stamp of elements found on the web page;

a mechanism for checking a requested web page's URL and time stamp and URL and time stamp of the requested web page's corresponding elements with the URL and time stamp listed in the table to determine whether any modification has been made; and a mechanism for selectively downloading in a cache only those elements which are deemed to have been modified.

12. The system for caching as recited in claim 11 further comprising:

a mechanism for updating the table such that the URL of the downloaded elements and their corresponding last access time and time stamp replace outdated information in the table.

13. The system for caching as recited in claim 11 wherein the requested web page is deemed to have been modified if the time stamp of the requested web page does not match with the time stamp in the table.

14. The system for caching as recited in claim 11 wherein an element is deemed to have been modified if the time stamp of the element does not match with the time stamp in the table.

15. The system for caching as recited in claim 11 wherein an element of a web page is deemed to have been modified if the URL of the web page is found in the table but URL of the corresponding element is not found in the table.

16. The system as recited in claim 11 wherein the mechanism for determining the time-based pattern of a high-access period keeps track of hit rates of the web page within a plurality of pre-determined time periods.

17. The system as recited in claim 11 wherein the mechanism for pre-fetching pre-fetches the web page during a time of low congestion.

* * * * *